United States Patent [19]
Mecklenborg

[11] 3,827,791
[45] Aug. 6, 1974

[54] OPTICAL PANORAMIC PROJECTION APPARATUS

[75] Inventor: Richard A. Mecklenborg, Binghamton, N.Y.

[73] Assignee: The Singer Company, Binghamton, N.Y.

[22] Filed: Aug. 10, 1972

[21] Appl. No.: 279,527

[52] U.S. Cl.............. 352/69, 355/52, 95/12.5, 95/50, 35/12 N, 352/132
[51] Int. Cl............................................. G03b 37/00
[58] Field of Search .............. 355/52; 95/12.5, 50; 352/69, 132; 35/12 N

[56] References Cited
UNITED STATES PATENTS

| | | | |
|---|---|---|---|
| 751,347 | 2/1904 | Scheimpflug | 355/52 X |
| 2,938,279 | 5/1960 | Hemstreet | 35/12 N X |
| 3,631,610 | 1/1972 | Cutler | 35/12 N |
| 3,639,034 | 2/1972 | Larussa | 35/12 N X |

Primary Examiner—Monroe H. Hayes
Attorney, Agent, or Firm—James C. Kesterson

[57] ABSTRACT

In the projection of a transparent orthophoto on to a cylindrical screen, a mercury capillary lamp provides a line of light which is focused on the orthophoto. One end of the line passes through an axis of the orthophoto and the line of light being rotated about the axis. Line images emanating from the orthophoto are transmitted through a Scheimpflug stage which provides magnified line images which are directed to a mirror and reflected therefrom on to the screen. The magnification of a magnified line image is related to its location with respect to the Scheimpflug stage.

7 Claims, 2 Drawing Figures

OPTICAL PANORAMIC PROJECTION APPARATUS

BACKGROUND OF THE INVENTION

1. Field of the Invention

This invention relates to optical projection apparatus and more particularly to apparatus for projecting the image of an orthophoto on to a cylindrical screen.

2. Description of the Prior Art

In one exemplary simulator known in the prior art, to simulate the view of the terrain from an aircraft a motion picture is taken of the terrain from a helicopter while flying along a predetermined line of flight. The motion picture film is then installed in a projector which is included in the simulator. The film is driven through the projector at a speed proportional to the simulated speed of the aircraft and projected on to a screen. Other aircraft phenomenon, such as pitch, roll, yaw and lateral translation are simulated by complex electro optical equipment which is responsive to inputs provided by the movement and the position of the simulator's controls.

In another exemplary simulator known in the prior art, a large relief model is made of the terrain. A TV camera is positioned over the model whereby video signals are provided representative of the view of the terrain. The camera is moved in response to the simulated position, altitude, roll, pitch and yaw of the aircraft, the video signals providing an input to projection apparatus for projecting on a screen a simulated view of the terrain.

Both of the exemplary systems described hereinbefore only provide a simulated view of the terrain in one plane. The planar view of the terrain may not suffice to provide a realistic simulation of the view from the aircraft.

Of the simulators for simulating the view of the terrain from an aircraft, they provide only a planar view of the terrain, utilize a costly model of the terrain, or require complex electro-optical apparatus for their implementation. Apparatus for providing a panoramic view of the terrain has heretofore been unknown in the prior art.

SUMMARY OF THE INVENTION

An object of the present invention is to project a panoramic view of the image of an orthophoto on to a vertical cylindrical screen.

Another object of the present invention is to project a panoramic view of the image of an orthophoto on to a vertical cylindrical screen, the view having a selected magnification.

According to the present invention, a line of light having one end on an optical axis is focused on a plate containing a transparent orthophoto; a line image emanating therefrom is transmitted through a Scheimpflug stage which provides a magnified line image which is projected on to a cylindrical screen; the magnification is related to the azimuthal location of the magnified line image about the optical axis with respect to said Scheimpflug stage, a projected image being provided by rotating said line of light about the optical axis and projecting the resulting magnified line images on to the screen, the alignment of the projected line images being parallel to the axis of the screen.

Apparatus in accordance with the present invention provides a simulated view of the terrain from an aircraft. The selected magnification of the image provides for the simulation of the view at selected altitudes.

Other objects, features and advantages of the present invention will become more apparent in the light of the following detailed description of a preferred embodiment thereof, as illustrated in the accompanying drawing.

DESCRIPTION OF THE PREFERRED EMBODIMENT

In the present invention, the image from an orthophoto is projected on to a vertical panoramic screen which is disposed on the inside wall of a cylindrically enclosed viewing area. The orthophoto is typically made from a photograph (taken by a camera aboard an aircraft) of a portion of terrain. The projected image has a selected magnification thereby providing to an observer a view substantially the same as the view from an aircraft at a selected altitude.

Figure 1:
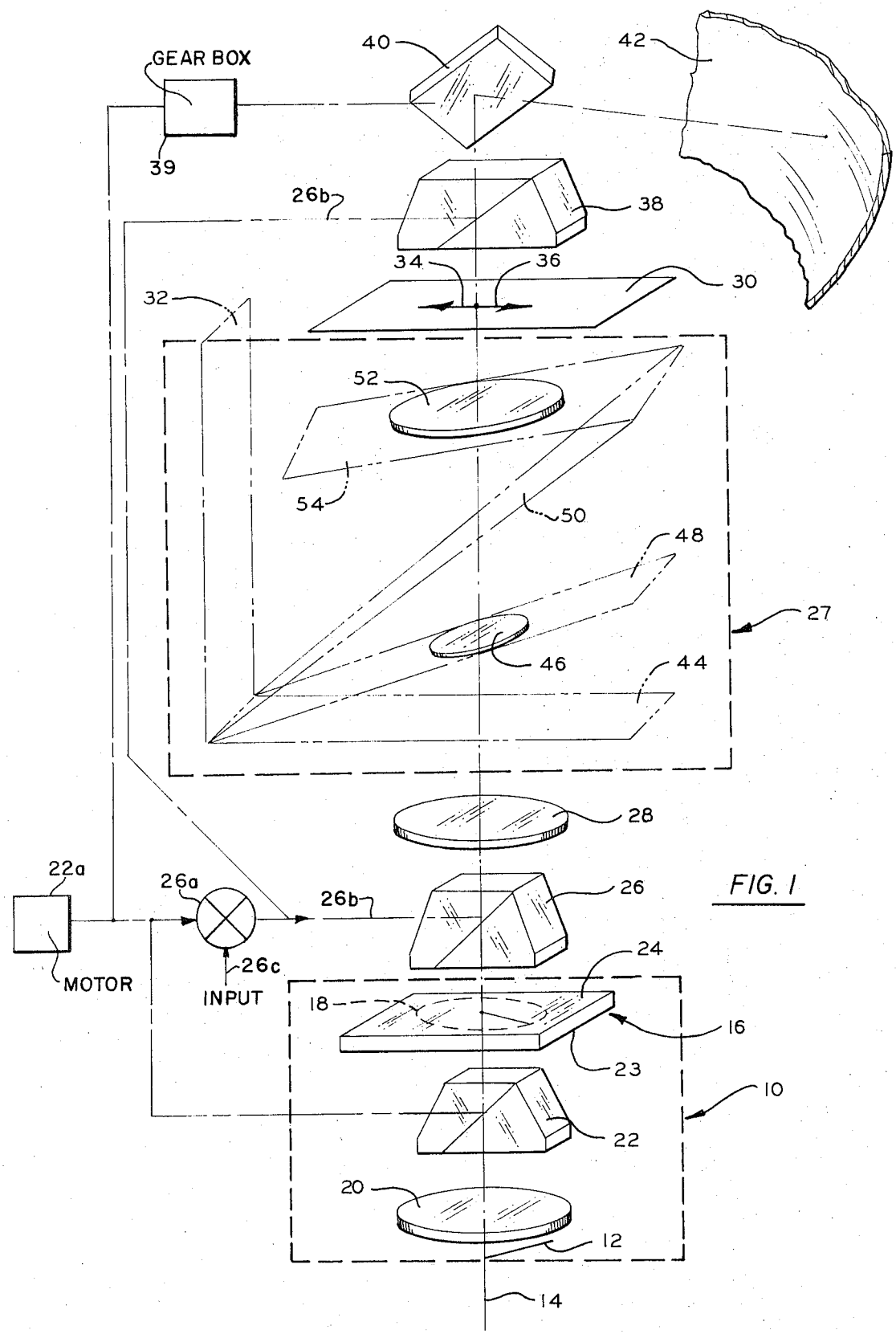
FIG. 1 is a schematic diagram of a preferred embodiment of the present invention.

Referring now to FIG. 1 of the drawing, an image scan stage 10 is comprised of a mercury capillary lamp 12. Mercury capillary lamps, which are well known in the art, provide a thin line of light. The lamp 12 is disposed to provide a thin line of light extending in a direction perpendicular to an optical axis 14. A transparent plate 16 has an orthophoto 18 with a transparent image contained therein. The optical axes of a lens 20, a first Pechan prism 22 and the center of the orthophoto 18 are all coaligned with the axis 14. The line of light from the lamp 12 is transmitted through the lens 20 and through the prism 22 which is mounted upon the shaft of a motor 22a whereby the prism 22 rotates azimuthally about an optical axis thereof at a rate equal to one-half of a scan rate. As is known to those skilled in the art, as the prism 22 rotates, the line of light transmitted therethrough rotates at the scan rate. A rotating line of light from the prism 22 is transmitted through a side 23 of the plate 16. The line of light is focused on the plate 16 by the lens 20. Accordingly, a line image emanating from a side 24 of the plate 16 is the image along a radial line of the orthophoto 18 where the line of light is focused, the angular location thereof moving at the scan rate to successive adjacent radii. Therefore, the line of light through the side 23 scans the orthophoto 18 and the line images that emanate from the side 24 collectively represent the image of the orthophoto 18.

The line image emanating from the side 24 is transmitted through a second Pechan prism 26 which is mounted upon a differential 26a at an output shaft 26b thereof. The rotational position of the output shaft 26b is the difference between the rotational positions of the shaft of the motor 22a and an input shaft 26c of the differential 26a. The input shaft 26c is normally stationary whereby the prism 26 normally rotates about an optical axis thereof at a rate equal to one-half of the scan rate. The effect of rotation of the shaft 26c is described hereinafter.

The optical axis of the prism 26 is coaligned with the axis 14 and the line image emanating therefrom is transmitted through a focusing lens 28. The line image emanating from the prism 26 is along a radial line extending from the axis 14 at a fixed angular location because the rate of rotation of the prisms 22, 26 are equal. It should be understood that the line image emanating from the prism 26 at any given time is substantially the same as the line image emanating from the side 24 of the plate 16.

A stationary Scheimpflug stage 27 is disposed along the axis 14 to receive the line image transmitted through the lens 28. The Scheimpflug stage 27 (fully explained in U.S. Pat. No. 751,347 and described hereinafter) provides in a plane 30 a magnified line image having a selected magnification related to the angular location of the magnified line image about the axis 14. A magnified line image along the line indicated by an arrow 34, for example, has a maximum magnification because it is closest to and along a line perpendicular to a reference plane 32, whereas a magnified line image along the line indicated by an arrow 36 which has an angular location opposite to the location of the arrow 34 has a minimum magnification because it is furthest from the plane 32. Magnified line images having a location intermediate to the location indicated by the arrows 34, 36 have an intermediate magnification. It should be understood that the magnified line image and the line image emanating from the prism 26 have identical angular locations about the axis 14.

Magnified line images are transmitted from the plane 30 through a third Pechan prism 38 which is mounted on the shaft 26b whereby the prism 38 rotates azimuthally about an optical axis thereof at a rate equal to one-half of the scan rate. The optical axis of the prism 38 is coaligned with the axis 14. Accordingly, the prism 38 provides, at the scan rate, the magnified line images corresponding to the line images emanating from the side 24 of the plate 16.

Connected to the shaft of the motor 22a through a gear box 39 is a mirror 40 which intersects the axis 14 at an angle of 45°. The gear box 39 causes the mirror 40 to rotate at the scan rate. The magnified line images from the prism 38 are reflected from the mirror 40. The reflection of the magnified line images from the mirror 40 comprise projected line images which are projected on to a cylindrical screen 42. It should be understood that at any given time the mirror 40 has an angular location to reflect the magnified line images (derived from each radial line of the orthophoto 18) in an alignment parallel to the axis of the screen 42. The scan rate is sufficiently rapid (above 30 revolutions/second) to provide to the observer a continuous view of the projected image.

It should be understood that in other embodiments a fixedly mounted conically shaped mirror may be used instead of the mirror 40.

In the present invention, the magnification provided by the Scheimpflug stage 27 may be altered by altering the relative azimuthal angular location about the axis 14 of the prisms 22, 26 thereby altering the angular location of the line image emanating from the prism 26. The relative angular locations of the prisms 22, 26 are altered by altering the position of the shaft 26c. Since the prism 38 is mounted on the shaft 26c, altering the position thereof does not skew the line image emanating from the prism 38. Since the angular location of the mirror 40 remains constant with respect to the line image emanating from the prism 38, aligned magnified line images are reflected. Alternatively, as will be explained below in connection with FIG. 2, the magnification may be altered by altering the azimuthal angular location of the Scheimpflug stage 27 about the axis 14.

In the Scheimpflug stage 27, the line image transmitted from the lens 28 is focused within a first Scheimpflug plane 44. A lens 46, disposed within a second Scheimpflug plane 48, has its optical axis displaced from the axis 14 by the angle of intersection of the plane 48 with a line normal to the axis 14. A third Scheimpflug plane 50 is disposed at an angle which causes each point on the image on the plane 44 to be focused within the plane 50. As is known to those skilled in the art, the displacement from the center of the lens 46 to an element of the image in the plane 44 is referred to as a conjugate to the displacement from the center of the lens 46 to the corresponding element within the plane 50. A lens 52 is disposed within a fourth Scheimpflug plane 54 which causes the displacement of elements of the image within the plane 50 to be conjugate to corresponding elements in the plane 30. The plane 32, referred to hereinbefore, includes the line formed by the intersection of the planes 44, 48, 50 and is parallel to the axis 14.

Figure 2:
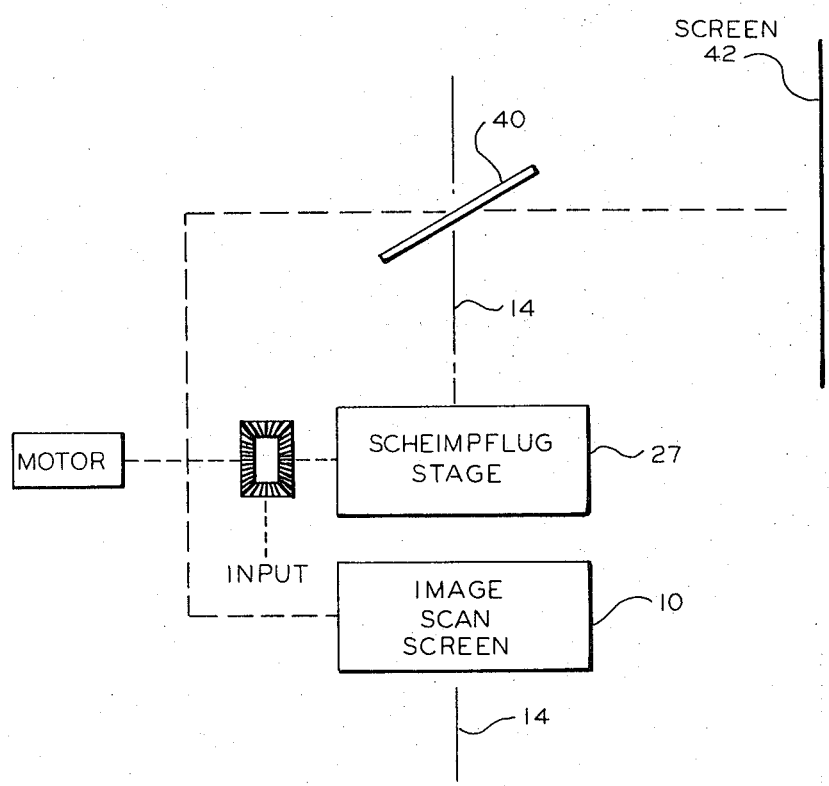
FIG. 2 is a block diagram of an alternative form of the invention.

In an alternative embodiment of the present invention illustrated in block form in FIG. 2, the prisms 26, 38 are eliminated and the Scheimpflug stage 27 is rotatably mounted for azimuthal rotation about the axis 14 at the scan rate. The image scan stage 10 and the Scheimpflug stage 27 may take the same forms as in FIG. 1 except the latter is now made rotatable. The line image from the side 24 of the plate 16 is transmitted through the lens 28 to the Scheimpflug stage 27 and the magnified light image is transmitted to the mirror 40. The magnification is altered by altering the angular location of the line of light provided within the plate 16 with respect to the Scheimpflug stage 27. It will be apparent that application of a rotational input to mechanical differential 26 will rotate stage 27 relative to stage 10. It should be understood that to continue to reflect the aligned magnified light images, the angular location of the mirror 40 must remain constant with respect to the line of light provided within the plate 16, and hence mirror 40 and stage 10 diagrammatically shown in FIG. 2 connected to be rotated by the motor shaft.

Although the invention has been shown and described with respect to a preferred embodiment thereof, it should be understood by those skilled in the art the various changes and omissions in the form and detail thereof may be made therein without departing from the spirit and the scope of the invention.

Having thus described a typical embodiment of my invention, that which I claim as new and desire to secure by Letters Patent of the United States is:

1. An optical projection apparatus for projecting the transparent image of an orthophoto within a transparent plate on to a cylindrical screen, comprising:

means for providing within said transparent plate a focused line of light having one end on an optical axis passing through the center of said orthophoto image, whereby a line image emanates from said plate.

means including a Scheimpflug stage, disposed along said axis for receiving said line image from said plate and providing in response thereto a line image having a magnification related to the angular location of the magnified line image about said axis, a magnified line image having a maximum magnification being provided at one known angular location and a magnified line image having a minimum magnification being provided at the opposite angular location with intermediate magnifications provided at locations intermediate thereto;

means for rotating said focused line of light about said optical axis thereby providing line images collectively representative of said orthophoto image; and means for projecting the magnified line images on to the screen, the alignment of the magnified line image being parallel to the axis of the screen.

2. Apparatus according to claim 1 wherein said means for providing a focused line of light comprises:
a mercury capillary lamp for providing a line of light; and
a focusing lens for focusing said line of light within said plate.

3. Apparatus according to claim 1 wherein said means for rotating comprises a Pechan prism rotatably mounted about an axis thereof which is coaligned with said optical axis, said prism being disposed to receive a line of light and transmit to said plate said line of light focused therein.

4. Apparatus according to claim 1 wherein said means for receiving said line image comprises a rotatably mounted Pechan prism having an axis coaligned with said optical axis, said prism being disposed to receive the line image emanating from said plate.

5. Apparatus according to claim 1 wherein said Scheimpflug stage is mounted for rotation about said optical axis.

6. Apparatus according to claim 1 wherein said means for projecting comprises a mirror mounted for rotation about said axis for reflecting the magnified light images on to said screen.

7. Apparatus according to claim 6 wherein said means for projecting comprises a Pechan prism rotatably mounted about an axis thereof which is coaligned with said optical axis, said prism being disposed to transmit the magnified light images to said mirror.

* * * * *